UNITED STATES PATENT OFFICE.

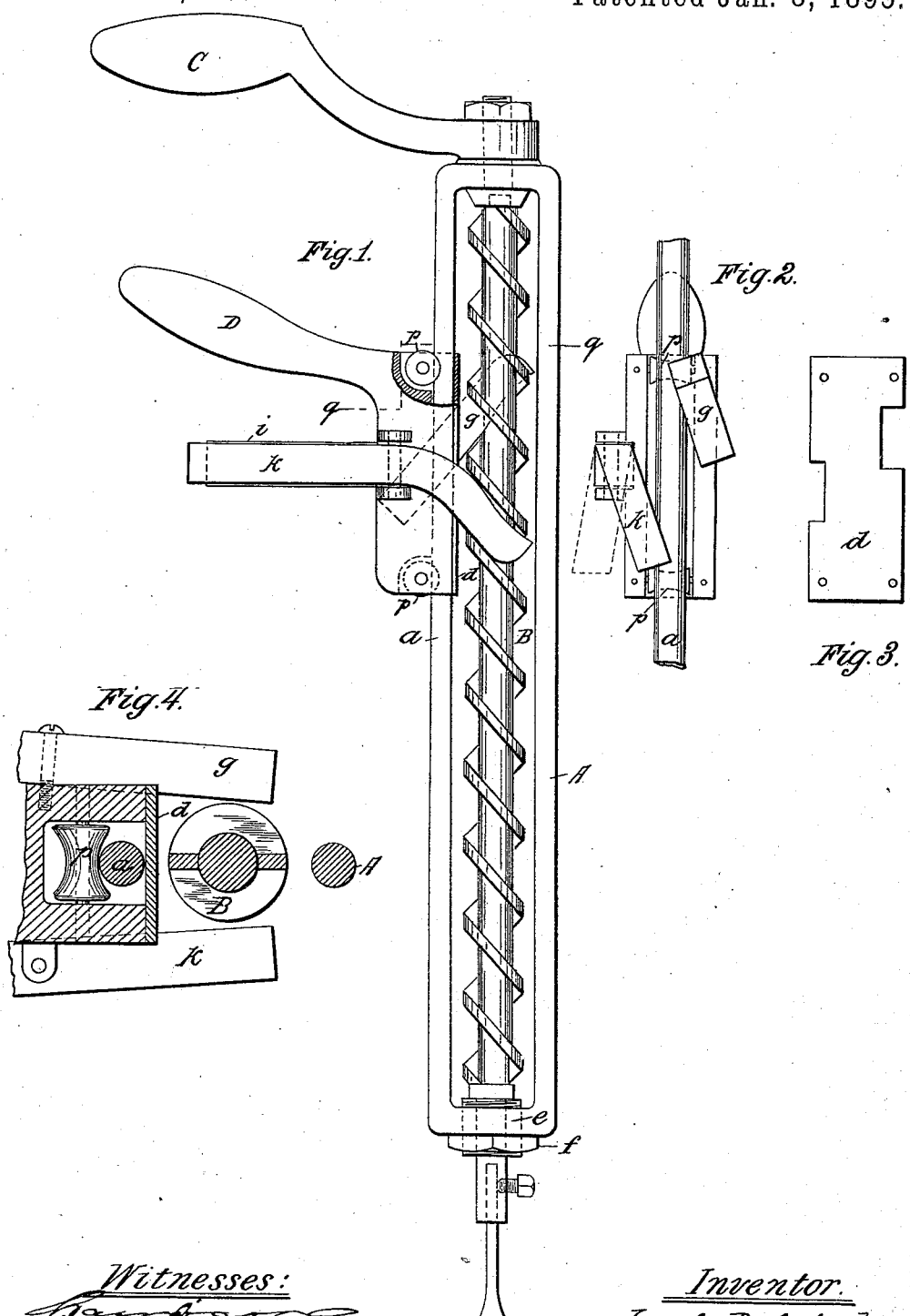

JOSEF DEFATSCH, OF WEST ORANGE, NEW JERSEY.

HAND-DRILL.

SPECIFICATION forming part of Letters Patent No. 532,145, dated January 8, 1895.

Application filed September 15, 1894. Serial No. 523,094. (No model.)

*To all whom it may concern:*

Be it known that I, JOSEF DEFATSCH, a citizen of the United States, residing at West Orange, in the county of Essex and State of New Jersey, have invented certain new and useful Improvements in Hand-Drills; and I do hereby declare the following to be a full, clear, and exact description of the invention, such as will enable others skilled in the art to which it appertains to make and use the same.

My invention relates to hand drills wherein the Archimedean screw is employed as a part of the mechanism and it consists in the device hereinafter set forth and finally pointed out in the claims.

The object of my invention is to provide a drill of the class mentioned which shall be capable of a forward or backward rotary motion or both forward and backward at the will of the operator. I accomplish this object by means of the device hereinafter described and illustrated by the accompanying drawings which form a part of this specification.

In the said drawings Figure 1 is a plan view of my invention having one corner of the handle D broken away for better illustration of the device; Fig. 2, a face view of the driving handle detached and with the plate $d$ removed therefrom; Fig. 3, a view in detail of the said plate $d$ and Fig. 4 an enlarged cross-sectional view of Fig. 1 taken on the line $q$ looking downwardly, a part of the same being broken away.

A is the frame which is formed with two round parallel rods and transverse ends of sufficient strength and dimensions to afford bearings for parts mounted therein as hereinafter described. The said frame A is made preferably of a single integral piece of malleable cast iron.

B is an Archimedean screw, one end of which is adapted to hold the drill or drill chuck. The said screw B is provided with a pivot on its upper end and a round extension on its lower end. It is mounted in the frame A by the pivot engaging with a pivot hole in a post screwed in the upper end of the frame and the round extension on the lower end passes through a set screw $e$ in the lower end of said frame. For convenience in manufacture and assembling the various parts of the structure I usually make the said set screw $e$ in the lower end of a larger diameter than the screw B. A nut $f$ on the end of said set screw $e$ serves to hold the same rigidly in place. A handle C is secured to the upper end of the frame A by means of a small threaded shank or post and thumb nut thereon.

The driving handle D is mounted on one of the rods $a$ of the frame A being channeled or guttered to fit over the said rod and a thin plate $d$ is secured to the face of the body portion thereof to hold the said handle in place. Two small anti-friction spools or rollers $p$ are mounted in the body portion of the handle D and play against the rod upon which said handle is mounted. It is preferable to have the said spools or rollers made with convex faces to approximate the form of the rod on which they run. A finger $g$ is rigidly attached to one side of the handle D in an upwardly slanting direction and engages with the thread on the screw B. A second finger $k$ is swung on a bearing on the opposite side of the handle D and slants in a downward direction engaging likewise with the thread of the screw B. I prefer to make the fingers square in cross-section to correspond to the thread of the screw B. The said finger $k$ is spring actuated toward the screw B by means of an ordinary flat spring $i$ secured to the handle D.

When the handle D is worked up and down upon its supporting rod $a$ of the frame A the result is a reciprocating rotary movement of the screw B. If however it is desired to have the screw B remain stationary or inoperative either upon the upward or downward stroke of the handle D this is accomplished by pressing down upon the finger $k$ which releases it from engagement with the screw B. and the said handle is then given a slight turn or twist and also releases the rigid finger $g$. Being thus thrown "out of gear" the screw B can be driven forward or backward or both at the will of the operator. Generally speaking it is usually most desirable to drive the drill only forward. Such being the case the operation in this instance is to push the handle downward and upon the upward pull thereof to release the engagement of the fingers $g$ and $k$ causing the screw B to remain stationary as will be understood.

The fixed handle C and the driving handle D should have a small diverging slant with relation to each other so as to give better accommodation or less interference to the hands of the operator when using the drill.

In Fig. 4 the spring actuated finger $k$ is in its raised position and the finger $g$, rigid with the handle D is thrown out of the thread on the screw B, which is done by a slight turn sidewise of the said handle D as heretofore mentioned. In other words the drill is "out of gear" and the handle D is capable of an up and down movement on the rod $a$ without causing revolution of the screw B.

I do not confine my invention to the use of a drill, as a screw driver may be secured to the screw B instead of a drill as shown.

Having thus described my invention, what I claim, and desire to secure by Letters Patent, is—

1. A hand drill comprising a frame A formed with parallel rods thereon, an Archimedean screw B mounted to turn in said frame, a driving handle D mounted upon one of the said rods, a rigid finger $g$ and a swinging spring actuated finger $k$ both mounted on the handle D and engaging with the screw B, a plate $d$ secured to the face of the handle D and anti-friction rollers $p$ mounted on the said handle substantially as described and for the purpose specified.

2. In a hand drill of the class specified a driving handle having a rigid finger and a spring actuated finger mounted thereon on opposite sides respectively and together straddling the screw in line of the thread thereof and capable of being released therefrom by pressure upon the spring actuated finger and a simultaneous turn of the said handle, the whole being mounted to slide upon a rod of the frame substantially as described.

3. A hand-drill comprising a frame A formed with parallel rods thereon, an Archimedean screw B mounted to revolve in said frame, a rigid finger $g$ and a swinging spring actuated finger $k$ both mounted on the handle D in engagement with the screw B, the said handle D being capable of a tilting movement on its track rod $a$ in a plane transverse to said track rod whereby the rigid finger $g$ is disengaged from the screw B substantially as described and for the purpose specified.

In testimony that I claim the invention above set forth I affix my signature in presence of two witnesses.

JOSEF DEFATSCH.

Witnesses:
LANPHEAR H. SCOTT,
BELLE L. PENNINGTON.